United States Patent
Lee et al.

(10) Patent No.: US 10,098,171 B2
(45) Date of Patent: Oct. 9, 2018

(54) METHOD AND APPARATUS FOR PERFORMING WIRELESS COMMUNICATION BETWEEN TERMINALS

(71) Applicant: Samsung Electronics Co., Ltd., Gyeonggi-do (KR)

(72) Inventors: Kyu-Suk Lee, Gyeonggi-do (KR); Seong-Woon Kang, Gyeonggi-do (KR); Young-Woong Kim, Seoul (KR); Sung-Jin Park, Seoul (KR); Jong-In Lee, Gyeonggi-do (KR); Kyung-Hoon Cha, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 15/394,077

(22) Filed: Dec. 29, 2016

(65) Prior Publication Data
US 2017/0111949 A1    Apr. 20, 2017

Related U.S. Application Data

(63) Continuation of application No. 13/919,430, filed on Jun. 17, 2013, now Pat. No. 9,537,564.

(30) Foreign Application Priority Data

Jun. 15, 2012 (KR) .................. 10-2012-0064456

(51) Int. Cl.
*H04B 7/00* (2006.01)
*H04W 76/14* (2018.01)
(Continued)

(52) U.S. Cl.
CPC .......... *H04W 76/14* (2018.02); *G06F 3/0383* (2013.01); *G06F 3/041* (2013.01); *H04W 4/008* (2013.01);
(Continued)

(58) Field of Classification Search
CPC ... H04W 76/023; H04W 4/008; H04W 8/005; G06F 3/0383; G06F 3/041
(Continued)

(56) References Cited

U.S. PATENT DOCUMENTS 5,693,914 A    12/1997  Ogawa
8,797,287 B2*   8/2014  Sundara-Rajan ..... G06F 3/0416
                                                178/18.01

(Continued)

FOREIGN PATENT DOCUMENTS

| EP | 1 237 333 | 9/2002 |
| KR | 10-0775195 | 11/2007 |
| KR | 10-0835440 | 6/2008 |

OTHER PUBLICATIONS

European Search Report dated Oct. 9, 2013 issued in counterpart application No. 13172229.0-1855.
(Continued)

*Primary Examiner* — Md Talukder
(74) *Attorney, Agent, or Firm* — The Farrell Law Firm, P.C.

(57) ABSTRACT

A method and an apparatus are provided for performing wireless communication between terminals. An inquiry message is transmitted to a neighboring terminal. An inquiry response message is received from the neighboring terminal. It is determined whether the apparatus overlaps the neighboring terminal. When the apparatus overlaps the neighboring terminal, paging is automatically performed, without intervention of a user of the apparatus, and pairing between the apparatus and the neighboring terminal is established.

20 Claims, 11 Drawing Sheets

(51) Int. Cl.
*H04W 76/02* (2009.01)
*H04W 8/00* (2009.01)
*H04W 4/00* (2018.01)
*G06F 3/041* (2006.01)
*G06F 3/038* (2013.01)
*H04W 4/80* (2018.01)

(52) U.S. Cl.
CPC ............ *H04W 4/80* (2018.02); *H04W 8/005* (2013.01); *H04W 76/023* (2013.01); *G06F 2203/04104* (2013.01)

(58) Field of Classification Search
USPC ...................................... 455/41.1, 41.2, 41.3
See application file for complete search history.

(56) References Cited

U.S. PATENT DOCUMENTS

| | | | |
|---|---|---|---|
| 2004/0048570 A1* | 3/2004 | Oba | G06F 1/1626 455/41.1 |
| 2004/0095333 A1 | 5/2004 | Morag et al. | |
| 2005/0093868 A1* | 5/2005 | Hinckley | G06F 3/011 345/502 |
| 2005/0104865 A1 | 5/2005 | Oda et al. | |
| 2005/0168399 A1* | 8/2005 | Palmquist | G06F 1/1601 345/1.1 |
| 2007/0177533 A1 | 8/2007 | Paley et al. | |
| 2009/0061942 A1* | 3/2009 | Smith | H04B 1/3805 455/566 |
| 2010/0167646 A1 | 7/2010 | Alameh | |
| 2011/0117897 A1 | 5/2011 | Lee | |
| 2011/0143769 A1* | 6/2011 | Jones | G06F 1/1624 455/456.1 |
| 2011/0156800 A1 | 6/2011 | Lee | |
| 2011/0209104 A1* | 8/2011 | Hinckley | G06F 3/0416 715/863 |
| 2011/0252317 A1* | 10/2011 | Keranen | G06F 3/04883 715/702 |
| 2011/0294433 A1* | 12/2011 | Matsubara | H04M 1/7253 455/41.3 |
| 2012/0015605 A1* | 1/2012 | Sole | H04W 12/06 455/41.3 |
| 2012/0060109 A1* | 3/2012 | Han | G06F 3/1454 715/769 |
| 2012/0062475 A1* | 3/2012 | Locker | G06F 3/041 345/173 |
| 2012/0081312 A1* | 4/2012 | Sirpal | G06F 1/1616 345/173 |
| 2012/0194637 A1* | 8/2012 | Han | H04N 5/23232 348/36 |
| 2012/0214416 A1 | 8/2012 | Kent | |
| 2012/0238246 A1* | 9/2012 | Rekimoto | G06F 1/1613 455/411 |
| 2012/0289158 A1 | 11/2012 | Patin | |
| 2013/0040562 A1 | 2/2013 | Song | |
| 2013/0076664 A1* | 3/2013 | Reeves | G06F 3/1438 345/173 |
| 2013/0093713 A1 | 4/2013 | Bose | |
| 2013/0106759 A1* | 5/2013 | Fredriksen | G06F 3/0416 345/174 |
| 2013/0203353 A1* | 8/2013 | Kim | H04B 7/24 455/41.2 |
| 2013/0217330 A1* | 8/2013 | Gardenfors | H04M 1/7253 455/41.2 |
| 2013/0217335 A1 | 8/2013 | Huibers | |
| 2013/0225078 A1* | 8/2013 | Johansson | H04W 76/10 455/41.2 |
| 2013/0278540 A1* | 10/2013 | Yilmaz | G06F 3/0416 345/174 |
| 2013/0314302 A1* | 11/2013 | Jeung | G06F 3/1454 345/2.3 |
| 2013/0337747 A1* | 12/2013 | Lee | G06F 3/0488 455/41.2 |
| 2014/0179227 A1* | 6/2014 | Nousiainen | H04W 84/18 455/41.2 |
| 2015/0065056 A1* | 3/2015 | Won | G06F 3/1462 455/41.3 |
| 2015/0220119 A1* | 8/2015 | Seo | G06F 3/041 345/173 |
| 2016/0029147 A1 | 1/2016 | Chiao | |
| 2016/0198499 A1* | 7/2016 | Lee | H04W 4/026 455/450 |
| 2016/0266686 A1* | 9/2016 | Kobori | G06F 3/041 |
| 2017/0012721 A1* | 1/2017 | Okamoto | H04B 17/318 |
| 2017/0048370 A1* | 2/2017 | Kim | H04M 1/7253 |

OTHER PUBLICATIONS

Korean Office Action dated Aug. 21, 2018 issued in counterpart application No. 10-2012-0064456, 9 pages.

* cited by examiner

METHOD AND APPARATUS FOR PERFORMING WIRELESS COMMUNICATION BETWEEN TERMINALS

PRIORITY

This application is a Continuation Application of U.S. patent application Ser. No. 13/919,430, which was filed in U.S. Patent and Trademark Office on Jun. 17, 2013, and claims priority under 35 U.S.C. § 119(a) to Korean Patent Application Serial No. 10-2012-0064456, which was filed in the Korean Intellectual Property Office on Jun. 15, 2012, the contents of each of which are incorporated herein by reference.

BACKGROUND

1. Field of the Invention

The present invention relates generally to a method for performing wireless communication between terminals, and more particularly, to automatic pairing between terminals.

2. Description of the Related Art

Most mobile terminals are able to transmit and receive necessary information therebetween based on wireless communication. Bluetooth is widely used as a short-range communication method among wireless communication methods. An authentication procedure for a connection between terminals is required to perform wireless communication using Bluetooth. The authentication procedure is performed through multiple steps.

In a first step, a main terminal searches for each neighboring terminal having a Bluetooth function. When the main terminal terminates the search for each neighboring terminal, a user of the main terminal selects a desired neighboring terminal. In order to find the terminal that the user desires, the user must clearly recognize the name of the desired terminal. When the user has selected the desired terminal, a message is displayed to the user that inquires whether the user desires for the main terminal to be connected to the selected terminal. When the user presses an accept button, the authentication procedure for wireless communication between the main terminal and the selected terminal is terminated. As described above, in order to perform wireless communication, the user must go through multiple steps. Also, in order to select the desired terminal, the user must be well-acquainted with an accurate name of the desired terminal.

SUMMARY

The present invention has been made to address at least the above problems and/or disadvantages and to provide at least the advantages described below. Accordingly, an aspect of the present invention provides a pairing method between terminals.

In accordance with an aspect of the present invention, a method is provided for performing wireless communication between terminals, by a main terminal. An inquiry message is transmitted to a neighboring terminal. An inquiry response message is received from the neighboring terminal. It is determined whether the main terminal overlaps the neighboring terminal. When the main terminal overlaps the neighboring terminal, paging is automatically performed, without intervention of a user of the main terminal, and pairing between the main terminal and the neighboring terminal is established.

In accordance with another aspect of the present invention, a machine-readable storage medium is provided for performing wireless communication between terminals and storing a program, which when executed implements the steps of transmitting an inquiry message to a neighboring terminal; receiving an inquiry response message from the neighboring terminal; determining whether the main terminal overlaps the neighboring terminal; and when the main terminal overlaps the neighboring terminal, automatically performing paging, without intervention of a user of the main terminal, and establishing pairing between the main terminal and the neighboring terminal.

In accordance with a further aspect of the present invention, an apparatus is provided for performing wireless communication between terminals. The apparatus includes a communication unit for transmitting an inquiry message to a neighboring terminal, and receiving an inquiry response message from the neighboring terminal. The apparatus also includes a controller for determining whether the apparatus overlaps the neighboring terminal, and when the apparatus overlaps the neighboring terminal, automatically performing paging, without intervention of a user of the apparatus, and establishing pairing between the apparatus and the neighboring terminal.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT DISCLOSURE

Figure 1:
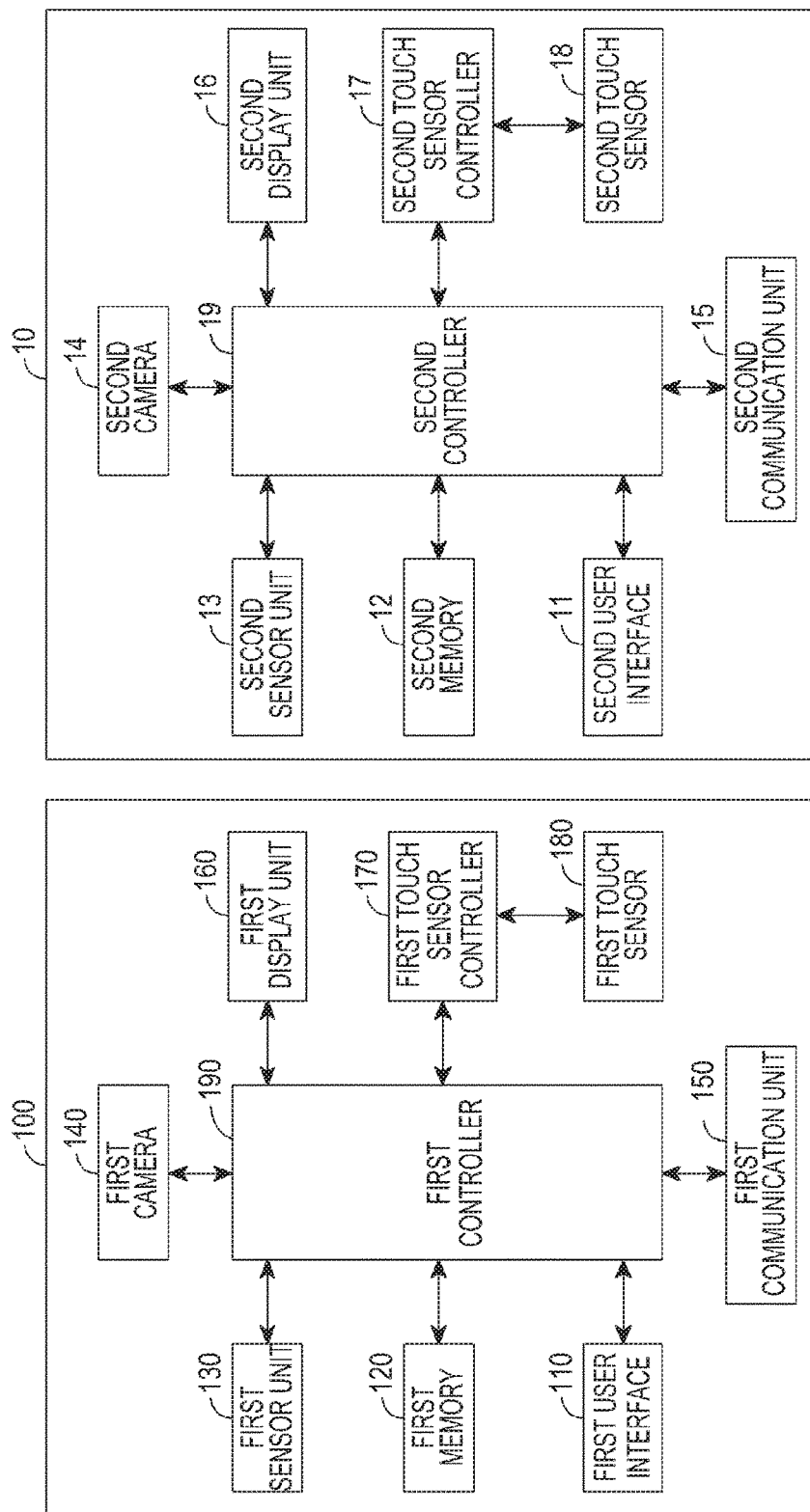
FIG. 1 is a block diagram illustrating a configuration of a communication system, according to an embodiment of the present invention.

Embodiments of the present invention are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although terms including ordinal numbers, such as, for example, first and second, may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

The terminology used herein is merely used to describe particular embodiments of the present invention, and is not intended to limit the present invention. As used herein, the singular forms "a," "an" and "the" are intended to include the plural forms as well, unless the context clearly indicates otherwise. In the present specification, it is to be understood that the terms "comprising," "including" or "having" are intended to indicate the existence of the features, numbers, steps, operations, elements, parts, or combinations thereof disclosed in the specification, and are not intended to preclude the possibility that one or more other features, numbers, steps, operations, elements, parts, or combinations thereof may exist or may be added.

Unless otherwise defined, all terms (including technical and scientific terms) used herein have the same meaning as commonly understood by those having ordinary knowledge in the technical field, to which the present invention pertains. Terms, such as those defined in commonly used dictionaries, should be interpreted as having a meaning that is consistent with their meaning in the context of the relevant art, and will not be interpreted in an idealized or overly formal sense unless expressly so defined herein.

FIG. 1 is a block diagram illustrating a configuration of a communication system, according to an embodiment of the present invention. The communication system includes a first terminal 100 and a second terminal 10. In this embodiment of the present invention, the first terminal 100 has a configuration identical to that of the second terminal 10. However, the first terminal 100 may have a configuration different from that of the second terminal 10. Hereinafter, a description will be made based on the first terminal 100. However, such a description may be applied to the second terminal 10. Similarly, a description of the second terminal 10 may be applied to the first terminal 100.

The first terminal 100 may be embodied as, for example, a smart phone, a mobile phone, a video game console, a television (TV), a display device, a head unit for a vehicle, a laptop computer, a tablet Personal Computer (PC), a Personal Media Player (PMP), a Personal Digital Assistant (PDA), an electronic paper, and the like. In an embodiment of the present invention, the term "terminal" may be replaced in use by a term, such as a portable terminal, a communication terminal, or a portable communication terminal.

The first terminal 100 may communicate with the second terminal 10, or may perform a task in association with the second terminal 10. The first terminal 100 may transmit screen data to the second terminal 10, via a network or a direct connection, to the second terminal 10. The first terminal 100 may control the second terminal 10, or may operate according to the control of the second terminal 10. This control may be implemented in various schemes. The networks may be a Local Area Network (LAN), a Wireless Local Area Network (WLAN), a Wide Area Network (WAN), an Internet, and a Small Area Network (SAN). However, the present invention is not limited to this configuration.

The first terminal 100 includes a first user interface 110, a first memory 120, a first sensor unit 130, a first camera 140, a first communication unit 150, a first display unit 160, a first touch sensor controller 170, a first touch sensor 180, and a first controller 190. The first touch sensor controller 170 may be integrated into the first touch sensor 180 or the first controller 190. Specifically, functions of the first touch sensor controller 170 may be regarded as being performed by the first touch sensor 180 or the first controller 190.

The first user interface 110, which is a means for receiving user input or notifying a user of information, may be embodied as, for example, a speaker, a microphone, multiple buttons, a vibration motor, a connector, and a keypad. For example, cursor control, such as, for example, a mouse, a trackball, a joystick or cursor direction keys, may be provided to the first user interface 110 in order to transmit and receive information to/from the first controller 190 and in order to control the movement of a cursor on a screen of the first display unit 160. However, embodiments of the present invention are not limited to this configuration.

According to the control of the first controller 190, the speaker may output sounds corresponding to various signals (e.g., a wireless signal, a broadcast signal, a digital audio file, a digital moving image file, and photography) to the outside of the first terminal 100. The first speaker may output a sound corresponding to a function that the first terminal 100 performs. The first terminal 100 may include multiple first speakers. The one first speaker or multiple first speakers may be disposed at an appropriate position or appropriate positions of the first terminal 100.

According to the control of the first controller 190, the microphone receives a voice or sound as input from the outside of the first terminal 100, and generates an electrical signal.

The buttons may be formed on a front surface, a lateral surface or a rear surface of the first terminal 100, and may include, for example, a power/lock button, a volume button, a menu button, a home button, a back button, a search button, and the like.

According to the control of the first controller 190, the vibration motor may convert an electrical signal into a mechanical vibration. For example, when the first terminal 100 in a vibration mode receives a voice call from another device, the vibration motor of the first terminal 100 operates. The first terminal 100 may include multiple vibration motors. The one vibration motor or multiple vibration motors may be mounted within the first terminal 100. The vibration motor may operate in response to a touch action of the user who touches a touch screen.

A connector may be used as an interface for connecting the first terminal 100 to an external device or a power source. According to the control of the first controller 190, through a wired cable connected to the connector, data stored in the first memory 120 of the first terminal 100 may be transmitted to the external device, or data may be received from the external device. Through the wired cable connected to the connector, power may be supplied by the power source or a battery may be charged.

The keypad may receive key input from the user in order to control the first terminal 100. The keypad includes a physical keypad installed on the first terminal 100 or a virtual keypad displayed on the touch screen.

The first display unit 160 may display an image based on an image signal which is input from the first controller 190, and simultaneously, may receive user input data (i.e., user input information) and may output the user input data to the first controller 190. The first display unit 160 may be embodied as a display unit such as, for example, a Liquid Crystal Display (LCD), an Organic Light Emitting Diode (OLED), or a Light Emitting Diode (LED), and a touch panel disposed below or above the display unit. The touch panel senses user input. When a user input means (e.g., a finger or a stylus) touches the surface (i.e., a screen) of the first display unit 160, the touch panel outputs a sensing signal (or touch sensing signal) having information on an input position (or input coordinates) and/or an input state (e.g., mouse down, mouse up, mouse movement, or the like). For example, the user may touch various executable items displayed on a screen of the first display unit 160, thereby executing an application related to the item. The first display unit 160 is a means for receiving input from the user, and outputs screen data related to applications, such as, for example, a camera application, video communication application and an Internet application. Although the touch screen is described as an example of the first display unit 160, the first display unit 160 may be implemented only by a conventional display apparatus. In an embodiment of the present invention, the screen may show the whole or part of an image displayed by the first display unit 160.

The first display unit 160 may provide the user with a graphical user interface matched to various services (e.g., telephone call, data transmission, broadcasting, and capturing of photographs and/or moving images). The first display unit 160 may transmit user input data matched to at least one touch, which is input to the graphical user interface, to the first controller 190.

According to embodiments of the present invention, a touch is not limited to the touch of the user's body or the input means enabling a touch on the first display unit 160, but may include a non-contact touch (e.g., a detectable distance between the first display unit 160 and the user's body or the input means enabling a touch is less than or equal to 1 mm). The touch screen, for example, may be embodied as, for example, a resistive touch screen, a capacitive touch screen, an infrared touch screen, an acoustic wave touch screen, and/or the like.

The first sensor unit 130 includes at least one sensor for detecting the state (e.g., location, bearing, direction, or movement) of the first terminal 100. For example, the first sensor unit 130 may include a proximity sensor for detecting whether the user is close to the first terminal 100, and a motion sensor for detecting motions of the first terminal 100 (e.g., the rotation, acceleration, deceleration, and vibration of the first terminal 100). Also, the motion sensor may include an acceleration sensor, a gravity sensor, a shock sensor, a GPS sensor, and a compass sensor. The first sensor unit 130 may detect the state of the first terminal 100, may generate a signal corresponding to the detection, and may transmit the generated signal to the first controller 190. For example, the GPS sensor may receive a signal (e.g., a radio wave) from each of multiple GPS satellites in the Earth's orbit, and may calculate a location of the first terminal 100 by using a Time Of Arrival (TOA) from each of the GPS satellites to the first terminal 100.

The first memory 120 may store applications for various functions such as, for example, a video call function and a game function; databases related to images, user information, documents, fingerprint information/data, and a table of mapping a fingerprint to a function for providing a Graphical User Interface (GUI) related to the applications; background images (for example, a menu screen image and a standby screen image) or operating programs that are required to drive the first terminal 100; images captured by the camera; and the like. The first memory 120 is a machine-readable medium. The term "machine-readable medium" can be defined as a medium which provides data to the machine in order to enable the machine to perform a particular function. The machine-readable medium may be a storage medium. The first memory 120 may include a non-volatile medium and a volatile medium. All of these mediums must be of a type that may be detected by a physical instrument that causes instructions delivered by the mediums to be read into the machine.

The machine-readable medium may be embodied as at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a flash-EPROM. However, the embodiments of the present invention are not limited to these configurations.

The first communication unit 150 is provided in order to be directly connected to an external device, or in order to be connected to it via a network, and may be a wired or wireless communication unit. The first communication unit 150 transmits data from the first controller 190, the first memory 120, the first camera 140 or the like, by a wire or wirelessly. Otherwise, the first communication unit 150 receives, by a wire, data from an external communication line, or wirelessly receives data transmitted over the air, and delivers the received data to the first controller 190, or stores the received data in the first memory 120.

According to performance of the first terminal 100, the first communication unit 150 may include at least one of a mobile communication module, a wireless LAN module and a short-range communication module. Examples of the first communication units 150 may include an Integrated Services Digital Network (ISDN) card, a modem, a LAN card, an Infrared module, a Bluetooth module, a Zigbee module, and a wireless module. However, embodiments of the present invention are not limited to this configuration. The first communication unit 150 may be a module that supports optional applicable wireless communication protocol, such as, for example, Universal Mobile Telecommunications System (UMTS), Global System for Mobile communications (GSM), Code Division Multiple Access (CDMA), CDMA2000, World Interoperability for Microwave Access (WIMAX), Third Generation Long Term Evolution (3G LTE), Wireless Fidelity (Wi-fi) 802.11x, Infrared Data Association (IrDA), Zigbee, Near Field Communication (NFC), Radio-Frequency IDentification (RFID), Bluetooth, Ultra-WideBand (UWB), or the like.

According to the control of the first controller 190, the mobile communication module allows the first terminal 100 to be connected to an external device through mobile communication by using at least one antenna. The mobile communication module transmits and receives a wireless signal for the exchange of data, or unidirectional transmission or reception of data, such as a voice call, a video call, a Short Message Service (SMS)) or a Multimedia Messaging Service (MMS), to/from a mobile phone, a smart phone, a tablet PC or another device, which has a telephone number or a network address, which is input to the first terminal 100.

According to the control of the first controller 190, the wireless LAN module may be connected to the Internet at a place where a wireless Access Point (AP) is installed. The wireless LAN module supports a wireless LAN standard (e.g., IEEE 802.11x of the Institute of Electrical and Electronics Engineers (IEEE)). According to the control of the first controller 190, the short-range communication module enables the first terminal 100 to perform short-range wireless communication with an external device.

The first camera 140 may include a lens system, a driving unit and an image sensor, and may further include a flash. The first camera 140 converts a light signal, which is input (or captured) through the lens system, into an electrical image signal or image data, and outputs the electrical image signal or image data. The user may capture a moving image or a still image through the first camera 140. In other words, the first camera 140 forms an optical image of the subject, and detects the formed optical image as an electrical signal.

The lens system forms an image of the subject by causing light incident from the outside to converge. The lens system includes at least one lens, and lenses may be a convex lens, an aspheric lens, and the like. The lens system has symmetry with respect to an optical axis passing through the center of the lens system, and the optical axis is defined as a central axis. The image sensor detects an optical image formed by external light incident through the lens system, as an electrical image signal.

The image sensor includes multiple pixels arranged in the structure of an M×N matrix, and the pixel may include a photo diode and at least one transistor. The pixel accumulates charges generated by incident light (i.e., an exposure process), and a voltage according to the accumulated charges represents the illuminance of the incident light (i.e., a process for outputting image data). In the case of processing a still image or one image included in a moving image file, image data which is output from the image sensor is formed by a set of voltages (i.e., pixel values) which are output from the pixels, and the image data represents one image (i.e., a still image). Also, the image includes M×N pixels. The image sensors may include a Charge-Coupled Device (CCD) image sensor, a Complementary Metal-Oxide Semiconductor (CMOS) image sensor, and the like.

The driving unit drives the image sensor according to the control of the first controller 190. According to a control signal received from the first controller 190, the driving unit exposes all pixels of the image sensor or only within a region of interest among all the pixels, and causes image data output from the pixels, to be output to the first controller 190.

The first controller 190 executes an application according to user input data, and the application performs a program operation according to the user input data. In this case, the user input includes input through the keypad, the touch screen or the like, or a camera-based input. The first controller 190 may include a bus for information exchange and a processor connected to the bus in order to process information. The first controller 190 may also include a second memory (e.g., a Random Access Memory (RAM)) connected to the bus in order to store information required by the processor. The second memory may be used to store temporary information required by the processor. The first terminal 100 may further include a Read Only Memory (ROM) connected to the bus in order to store static information required by the processor. The first controller 190 which is a Central Processing Unit (CPU), controls an overall operation of the first terminal 100, and serves to perform a wireless pairing method and a dual display method according to an embodiment of the present invention. The first controller 190 processes an image received from the first camera 140, or an image stored in the first memory 120, on a frame-by-frame basis, and outputs an image frame which is converted to meet the characteristics (for example, size, image quality and resolution) of the screen of the first display unit 160.

Figure 2:
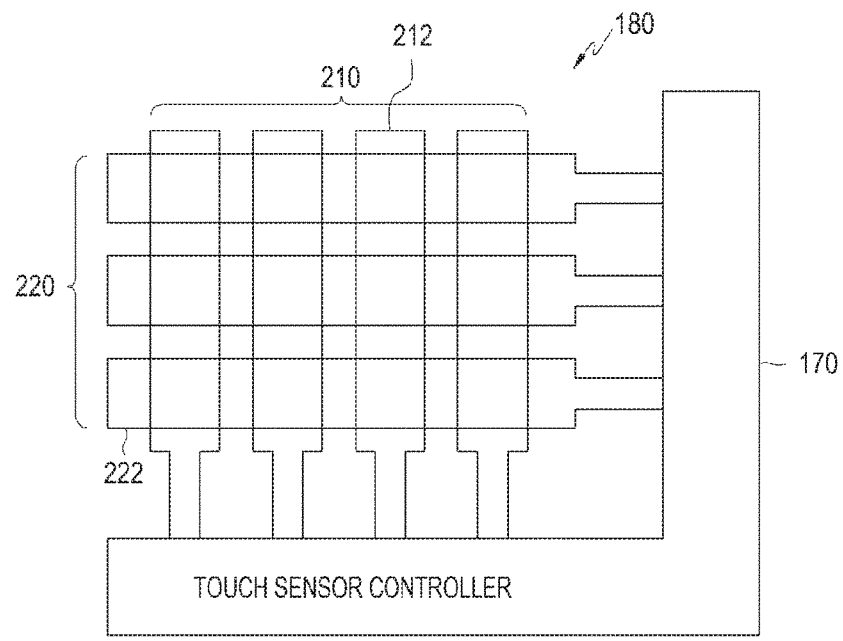
FIG. 2 is a view illustrating a touch sensor and a touch sensor controller, according to an embodiment of the present invention.

FIG. 2 is a diagram illustrating a touch sensor and a touch sensor controller, according to an embodiment of the present invention.

The touch sensor 180, which is an Electromagnetic Resonance (EMR) type-touch sensor, includes first and second loop units 210 and 220, operates according to the control of the first touch sensor controller 170, and outputs the detected signals to the first touch sensor controller 170. The first loop unit 210 includes multiple first loops 212, and the second loop unit 220 includes multiple second loops 222.

The first loop unit 210 and the second loop unit 220 may be disposed in directions such that the first loop unit 210 lies perpendicular to the second loop unit 220.

The first loop unit 210 is longer in the y-axis direction than in the x-axis direction. Accordingly, the first loop unit 210 is used to detect an x-axis coordinate of a position of pen input (i.e., a position of user input or a touch position). Also, the first loop unit 210 is used to detect an x-axis coordinate of an overlap position of the first and second touch sensors 180 and 18.

The second loop unit 220 is longer in the x-axis direction than in the y-axis direction. Accordingly, the second loop unit 220 is used to detect a y-axis coordinate of a position of pen input. Also, the second loop unit 220 is used to detect a y-axis coordinate of an overlap position of the first and second touch sensors 180 and 18.

Each of the first and second loops 212 and 222 may output a first signal of a first frequency in the form of an electrical signal received from the first touch sensor controller 170, as a signal in the form of an electromagnetic wave. Also, each of the first and second loops 212 and 222 may detect a second signal of a second frequency in the form of an electromagnetic wave, which is output from an external pen, or a third signal of the first frequency in the form of an electromagnetic wave, which is output from the second touch sensor 18, as a signal in the form of an electrical signal. Each of the first and second loops 212 and 222 then outputs the detected signal in the form of an electrical signal to the first touch sensor controller 170.

A pen existing around the first touch sensor 180 receives the first signal in the form of an electromagnetic wave which is output from the first touch sensor 180, generates a second signal in the form of an electromagnetic wave according to an operation of a resonant circuit, and outputs the generated second signal to the outside. Meanwhile, in an embodiment of the present invention, the pen is described only as an example, and thus has no restrictions thereon when the pen corresponds to a means capable of outputting the second signal of the second frequency in response to the input of the first signal of the first frequency. Such a means may be commonly referred to as a user input means. The pen includes a resonant circuit in which the first touch sensor 180 of the EMR-type may sense a position of the pen and which includes coils and capacitors.

Figure 3:
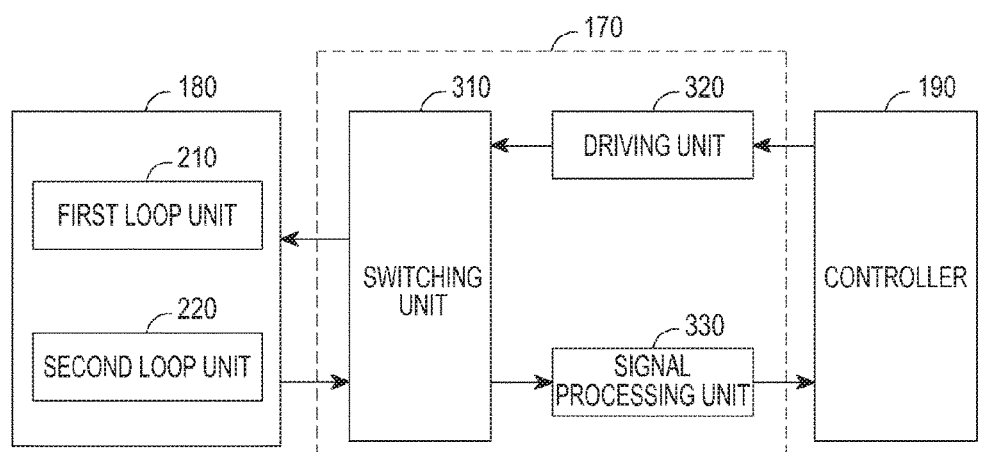
FIG. 3 is a block diagram illustrating a detailed configuration of a first touch sensor controller, according to an embodiment of the present invention.

FIG. 3 is a block diagram illustrating a detailed configuration of a first touch sensor controller, according to an embodiment of the present invention. The first touch sensor controller 170 includes a driving unit 320, a switching unit 310 and a signal processing unit 330.

During a first cycle, the first touch sensor controller 170 controls the first loop unit 210 to output the first signal to the outside, and controls the second loop unit 220 to output the second signal and the third signal to the signal processing unit 330. The switching unit 310 connects the multiple first loops 212 to the driving unit 320 in order, and thereby allows the multiple first loops 212 to sequentially output first signals to the outside. The switching unit 310 also connects the multiple second loops 222 to the signal processing unit 330 in order, and thereby allows the multiple second loops 222 to sequentially output the second signals or the third signals to the signal processing unit 330.

During a second cycle, the first touch sensor controller 170 controls the second loop unit 220 to output first signals to the outside, and controls the first loop unit 210 to output second signals to the signal processing unit 330. The switching unit 310 connects the multiple second loops 222 to the driving unit 320 in order, and thereby allows the multiple second loops 222 to sequentially output the first signals to the outside. The switching unit 310 also connects the multiple first loops 212 to the signal processing unit 330 in order, and thereby allows the multiple first loops 212 to sequentially output the second signals or third signals to the signal processing unit 330. The first and second cycles are alternately and continuously repeated.

The driving unit 320 outputs the first signal of the first frequency to the switching unit 310. The first frequency is higher than the second frequency, and an Alternating Current (AC) current source may be used as the driving unit 320.

Figure 4:
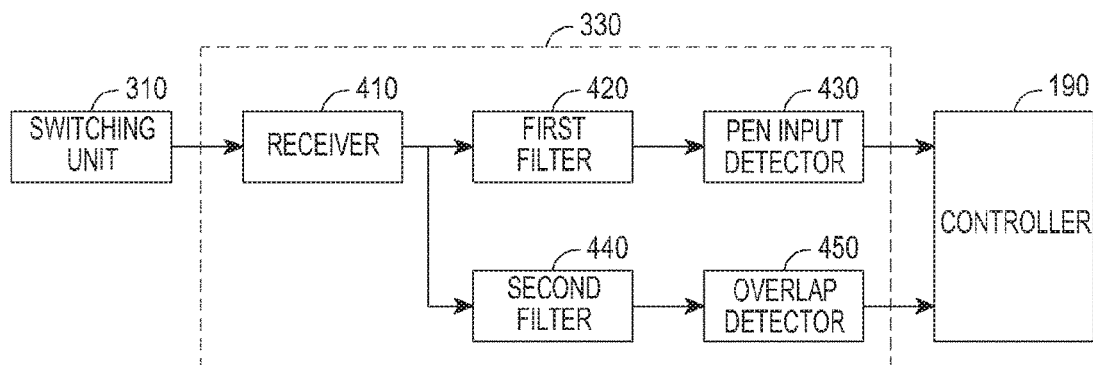
FIG. 4 is a block diagram illustrating a detailed configuration of a signal processing unit, according to an embodiment of the present invention.

FIG. 4 is a block diagram illustrating a detailed configuration of a signal processing unit, according to an embodiment of the present invention.

The signal processing unit 330 includes a receiver 410, first and second filters 420 and 440, a pen input detector 430, and an overlap detector 450.

The receiver 410 amplifies the second signals received from the switching unit 310, and outputs the amplified second signals.

The first filter 420 filters frequencies of the second and third signals received from the receiver 410, and thereby outputs only the second signals of the second frequency to the pen input detector 430. The first filter 420 may be a band-pass filter for passing a low frequency band or a wavelength-selective filter for selectively passing only particular low frequency components.

The second filter 440 filters frequencies of the second and third signals received from the receiver 410, and thereby outputs only the third signals of the first frequency to the overlap detector 450. The second filter 440 may be a band-pass filter for passing a high frequency band or a wavelength-selective filter for selectively passing only particular high frequency components.

The pen input detector 430 detects a pair of second signals, each having a peak voltage value that is greater than or equal to a first threshold among the second signals, derives x-axis and y-axis coordinates of a position of pen input from the pair of second signals, and outputs the derived x-axis and y-axis coordinates to the first controller 190.

Figure 5:
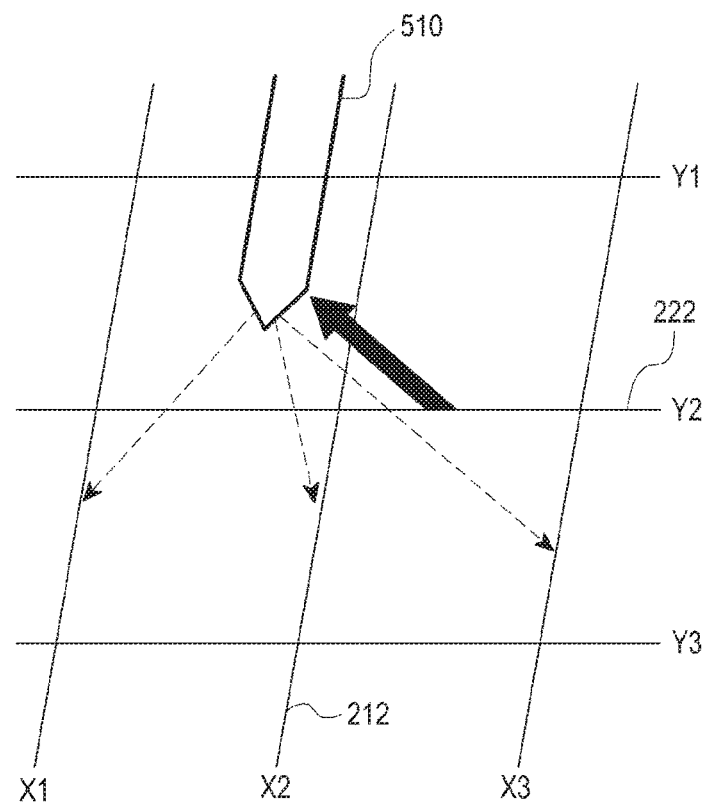
FIGS. 5 and 6 are diagrams illustrating a method for detecting a position of pen input, according to an embodiment of the present invention.
Figure 6:
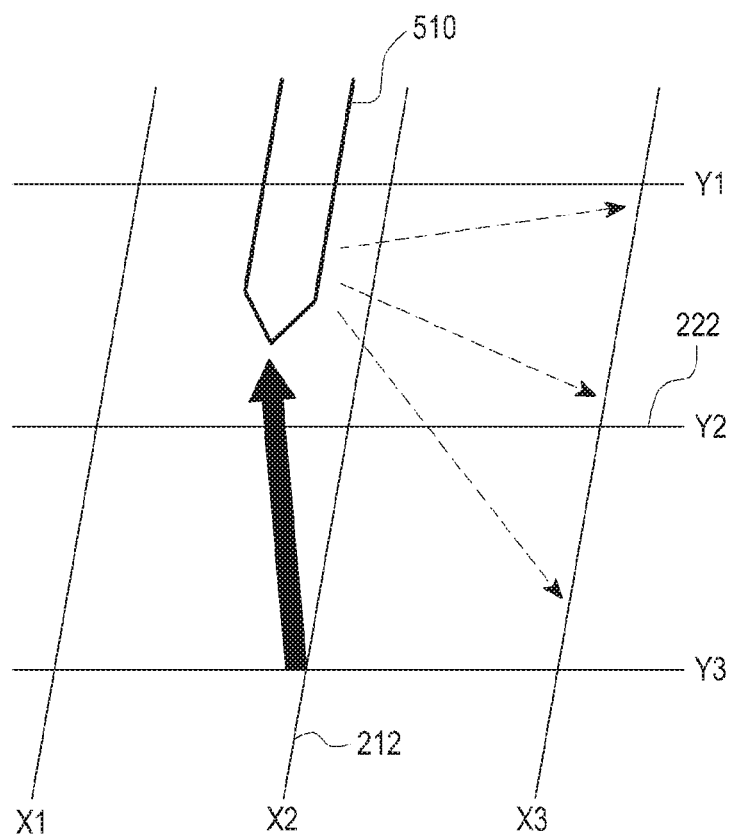

FIGS. 5 and 6 are diagrams illustrating a method for detecting a position of pen input according to an embodiment of the present invention. In FIGS. 5 and 6, each of the first and second loops 212 and 222 is schematically shown as one line.

Referring to FIG. 5, the second loop 222 (hereinafter, referred to as a "Y2 loop") outputs a first signal to the outside. Also, a pen 510 receives the first signal in the form of an electromagnetic wave, generates a second signal in the form of an electromagnetic wave according to an operation of the resonant circuit, and outputs the generated second signal to the outside. The multiple first loops 212 (hereinafter, referred to as "X1, X2 and X3 loops") sequentially detect the second signals as signals in the form of an electrical signal. The pen input detector 430 derives an x-axis coordinate of a position of pen input, from a second signal having a peak voltage value that is greater than or equal to a first threshold, which is output from the X2 loop among the second signals.

Referring to FIG. 6, the first loop 212 (hereinafter, referred to as an "X2 loop") outputs a first signal to the outside. Also, the pen 510 receives the first signal in the form of an electromagnetic wave, generates a second signal in the form of an electromagnetic wave according to an operation of the resonant circuit, and outputs the generated second signal to the outside. The multiple second loops 222 (hereinafter, referred to as "Y1, Y2 and Y3 loops") sequentially detect the second signals as signals in the form of an electrical signal. The pen input detector 430 derives a y-axis coordinate of the position of the pen input, from a second signal having a peak voltage value that is greater than or equal to a first threshold, which is output from the Y2 loop among the second signals.

In a first mode, the overlap detector 450 may determine only whether the first touch sensor 180 overlaps the second touch sensor 18, and may output only a result of the determination to the first controller 190. Otherwise, in a second mode, the overlap detector 450 may output x-axis and y-axis coordinates of an overlap position or area together with whether the first touch sensor 180 overlaps the second touch sensor 18, to the first controller 190. Whether the first touch sensor 180 overlaps the second touch sensor 18 may be known from whether an overlap position is output.

In the first mode, when at least a pair of third signals each having a peak value greater than or equal to a second threshold are detected among third signals, the overlap detector 450 may output an overlap detection signal to the first controller 190.

In the second mode, the overlap detector 450 detects at least a pair of third signals each having a peak value greater than or equal to the second threshold among the third signals, derives x-axis and y-axis coordinates of at least one overlap position from at least the pair of third signals, and outputs the derived x-axis and y-axis coordinates to the first controller 190.

Figure 7:
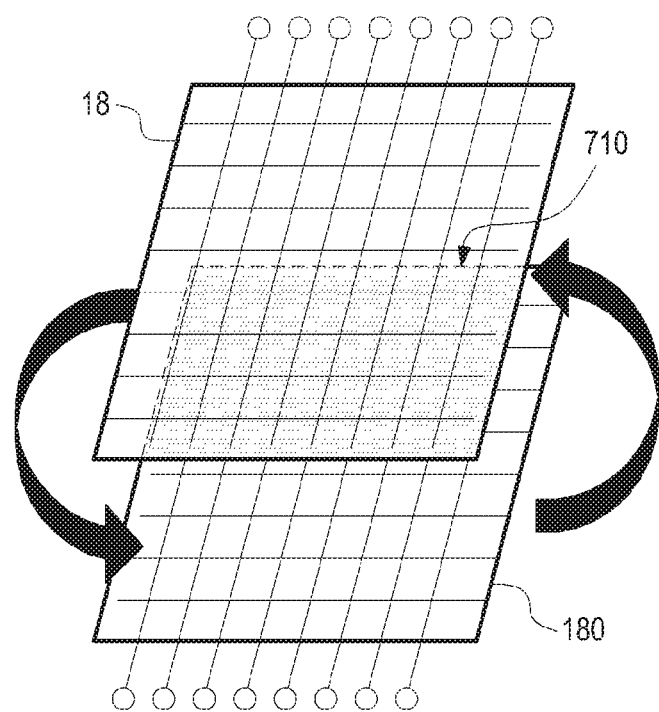
FIG. 7 is a diagram illustrating a method for detecting an overlap of first and second touch sensors, according to an embodiment of the present invention.

FIG. 7 is a diagram illustrating a method for detecting an overlap of first and second touch sensors, according to an embodiment of the present invention. For convenience of understanding, FIG. 7 illustrates only the disposition relation between the first and second touch sensors 180 and 18, according to an overlap of the first terminal 100 and the second terminal 10.

As illustrated in FIG. 7, the first terminal 100 and the second terminal 10 may know that they overlap each other according to the generation of an overlap detection signal from each of them. Also, the first terminal 100 and the second terminal 10 may detect an overlap area (a shaded area) 710.

Referring back to FIG. 1, the second terminal 10 includes a second user interface 11, a second display unit 16, a second sensor unit 13, a second memory 12, a second communication unit 15, a second camera 14, a second touch sensor 18, a second touch sensor controller 17 and a second controller 19. A description of elements of the second terminal 10 is identical to that of corresponding elements of the first terminal 100, each of which has the same name as the corresponding element of the second terminal 10, except for an ordinal number.

A wireless communication method and a dual display method, according to an embodiment of the present invention, are performed under the condition that one of the first terminal 100 and the second terminal 10 becomes a main terminal and the other becomes a sub-terminal. In the present example, the first terminal 100 becomes a main terminal and the second terminal 10 becomes a sub-terminal.

The wireless communication method, according to an embodiment of the present invention, is performed in a normal pairing mode or in an automatic pairing mode, according to whether an overlap is detected.

Figure 8:
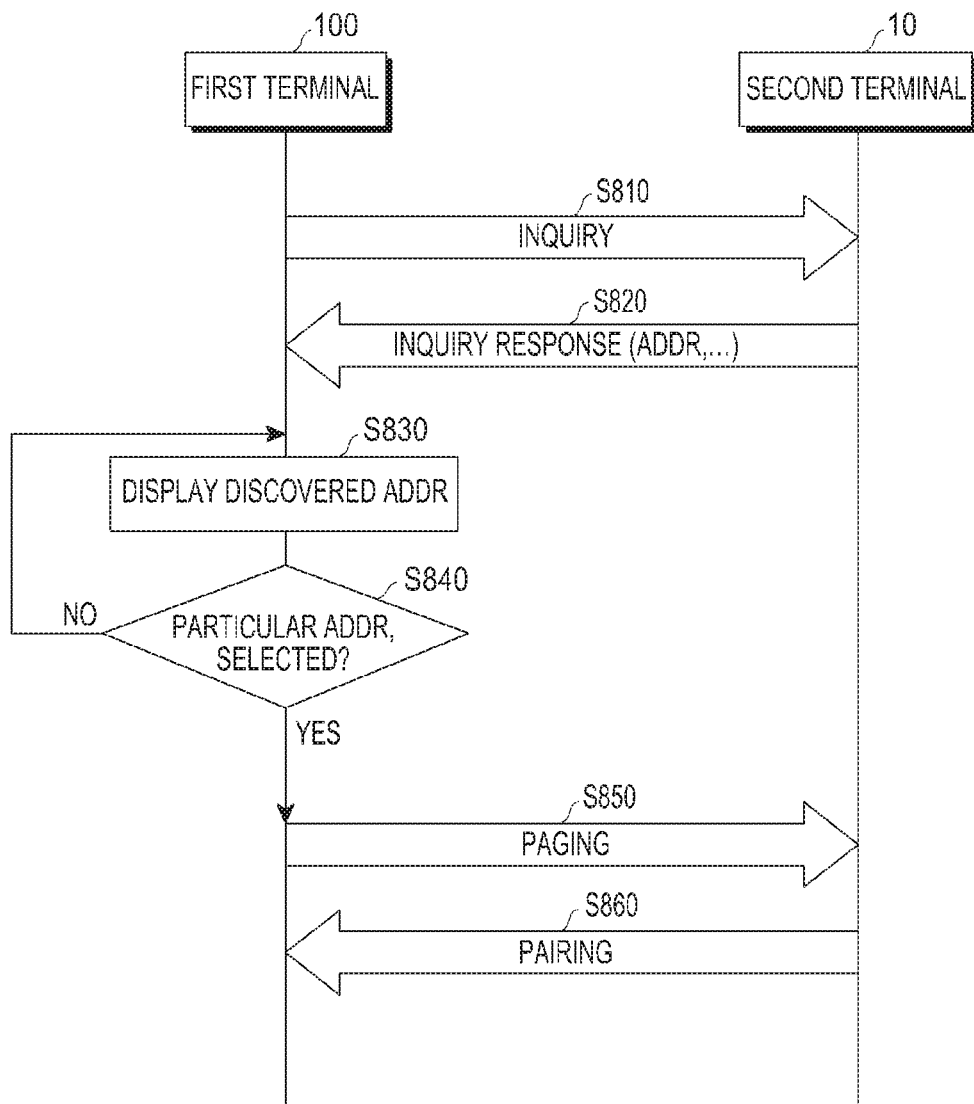
FIG. 8 is a signal flow diagram illustrating a wireless pairing method according to a normal pairing mode, according to an embodiment of the present invention.

FIG. 8 is a signal flow diagram illustrating a wireless pairing method according to a normal pairing mode, according to an embodiment of the present invention. Hereinafter, functions performed by each of the first terminal 100 and the second terminal 10 are functions that each of the first controller 190 of the first terminal 100 and the second controller 19 of the second terminal 10 performs by using elements other than each of the first controller 190 and the second controller 19.

In step S810, the first terminal 100 transmits an inquiry message through the first communication unit 150 in order to identify whether other terminals exist around the first terminal 100. Specifically, the first terminal 100 begins to search for a neighboring terminal while it performs an inquiry.

In step S820 the second terminal 10, which is in a discoverable mode, transmits an inquiry response message to the inquiry through the second communication unit 15. The discovered second terminal 10 includes various pieces of information possessed by itself, for example, a device address (ADDR), clock information (CLKN), and an error detection and correction signal (Bose-Chaudhuri-Hocquenghem code (BCH code)), in the inquiry response message, and transmits the inquiry response message including the various pieces of information, to the first terminal 100.

In step S830, the first terminal 100, which has received an inquiry response message from each of the neighboring terminals including the second terminal 10, displays a list including indicators (e.g., addresses) for all of the discovered terminals, through the first display unit 160.

In step S840, the first terminal 100 determines whether a user selects a particular terminal from among the neighboring terminals displayed in the list. When the user selects the particular terminal from among the neighboring terminals displayed in the list, the first terminal 100 performs step S850. When the user does not select the particular terminal from among the neighboring terminals displayed in the list, the first terminal 100 maintains step S830. The user selects the particular terminal (in the present example, the second terminal 10) intended to be paired (or connected) with the first terminal 100, from among the discovered neighboring terminals displayed by the first display unit 160 of the first terminal 100. When the user has selected the second terminal 10, the first terminal 100 displays a window for inputting a password, on the screen of the first display unit 160. When the user inputs the password, the first terminal 100 sequentially performs steps of paging (or synchronization) with respect to the second terminal 10 and pairing between itself and the second terminal 10, together with the second terminal 10.

In step S850, the first terminal 100 synchronizes a hopping sequence between itself and the second terminal 10 by using an address, clock information and the like.

In step S860, pairing between the first terminal 100 and the second terminal 10 is established.

Figure 9:
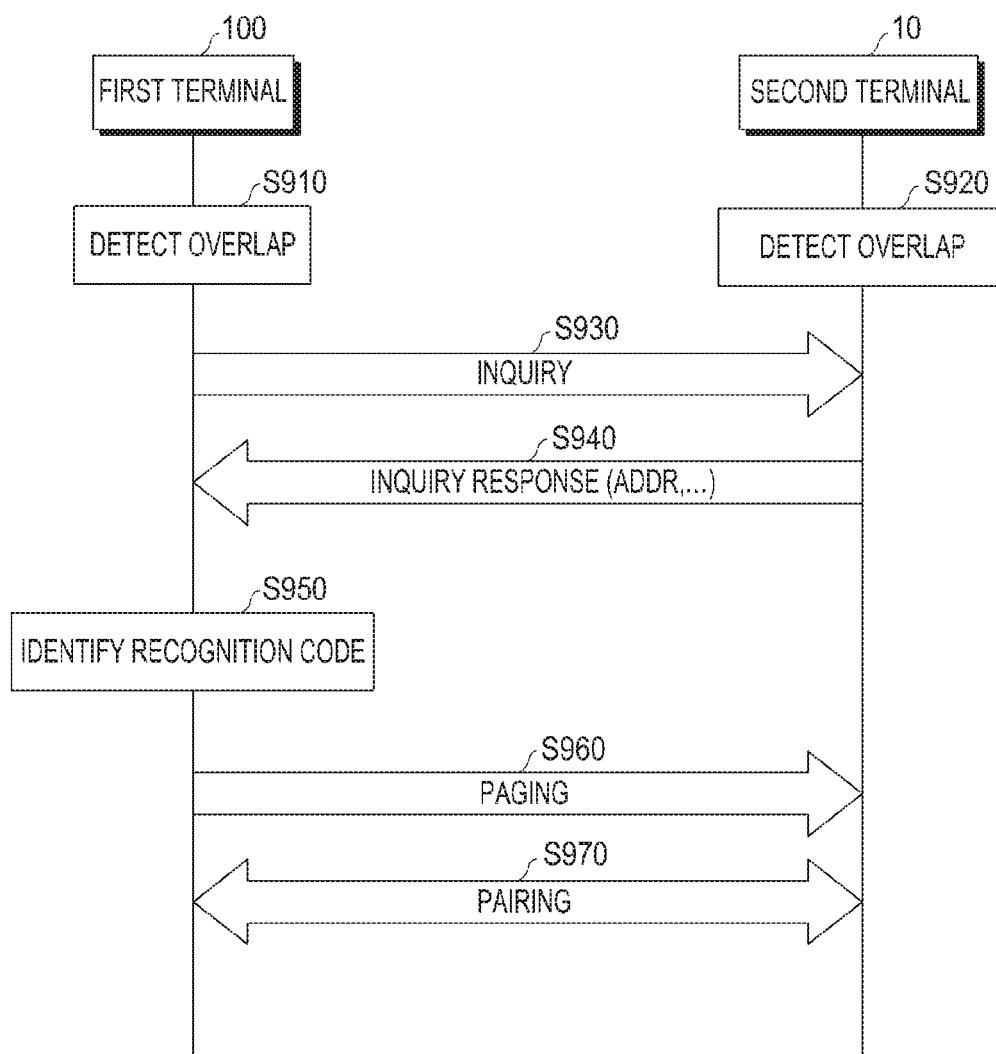
FIG. 9 is a signal flow diagram illustrating a wireless communication method according to an automatic pairing mode, according to an embodiment of the present invention.

FIG. 9 is a signal flow diagram illustrating a wireless communication method according to an automatic pairing mode, according to an embodiment of the present invention.

In step S910, the first terminal 100 receives an overlap detection signal from the first touch sensor controller 170, and thereby detects that it overlaps the second terminal 10.

In step S920, the second terminal 10 receives an overlap detection signal from the second touch sensor controller 17, and thereby detects that it overlaps the first terminal 100.

In step S930, the first terminal 100 transmits an inquiry message in order to identify whether other terminals exist around the first terminal 100. Specifically, the first terminal 100 begins to search for a neighboring terminal while it performs an inquiry.

In step S940, the second terminal 10, which is in a discoverable mode, transmits an inquiry response message to the inquiry. The discovered second terminal 10 includes various pieces of information possessed by itself, for example, information such as a device address (ADDR), clock information (CLKN), and an error detection and correction signal (Bose-Chaudhuri-Hocquenghem code (BCH code)), and a recognition code (R-code), in an inquiry response message, and transmits the inquiry response message including the various pieces of information, to the first terminal 100. The recognition code is an optional code indicating that the second terminal 10 overlaps the first terminal 100.

In step S950, the first terminal 100, which has received the inquiry response message from the second terminal 10, identifies the recognition code included in the inquiry response message, does not wait for an inquiry response message from another terminal, and sequentially performs steps of paging (or synchronization) with respect to the second terminal 10 and pairing between itself and the second terminal 10, together with the second terminal 10. Differently from the present example, the recognition code may be transmitted to the first terminal 100 through a separate message other than the inquiry response message.

In step S960, the first terminal 100 synchronizes a hopping sequence between itself and the second terminal 10 by using an address, clock information and the like.

In step S970, pairing between the first terminal 100 and the second terminal 10 is established.

Figure 10:
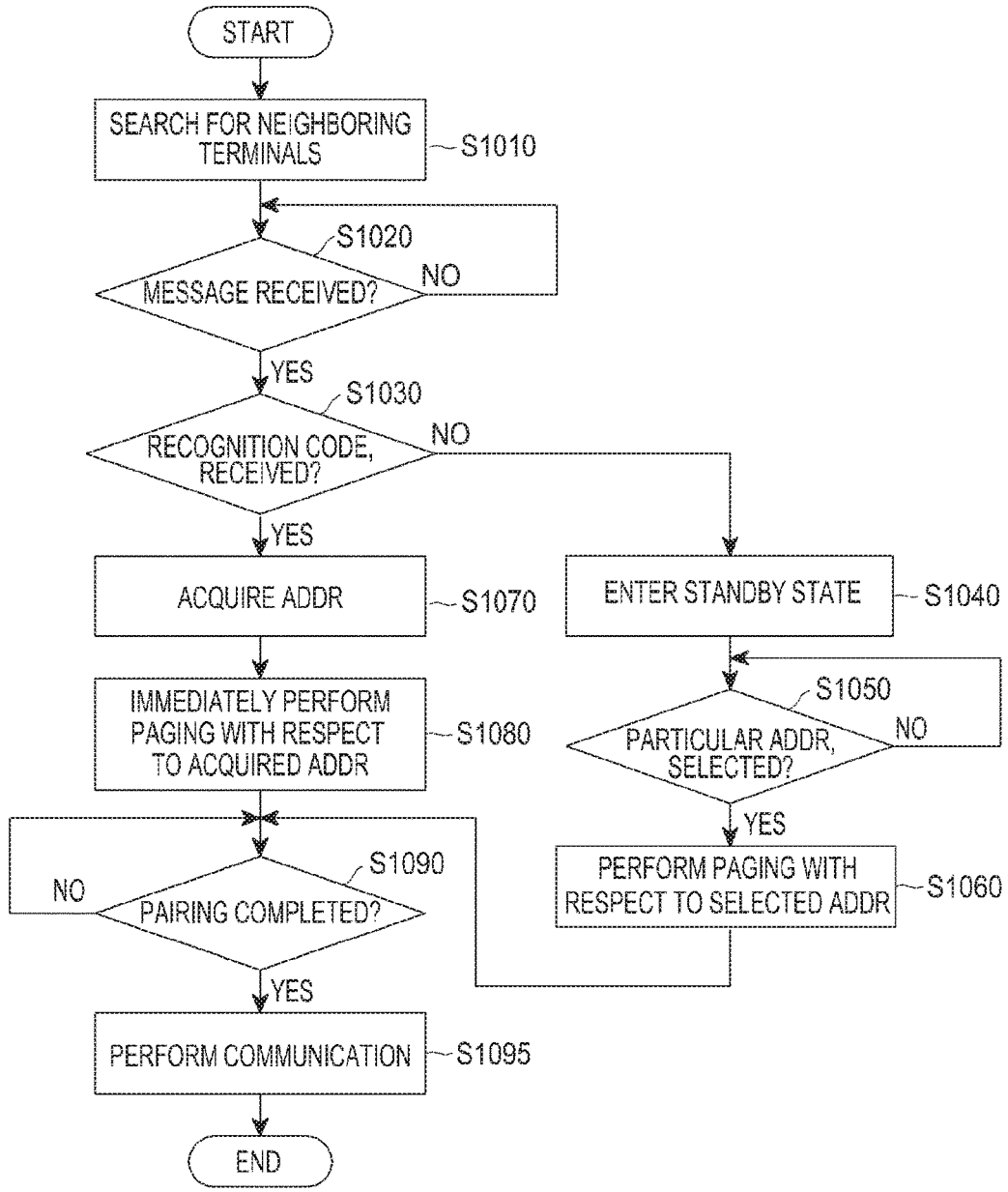
FIG. 10 is a flowchart illustrating a method for performing wireless communication by a first terminal, according to an embodiment of the present invention.

FIG. 10 is a flowchart illustrating a method for performing wireless communication by a first terminal, according to an embodiment of the present invention.

In step S1010, the first terminal 100 transmits an inquiry message in order to search for neighboring terminals.

In step S1020, the first terminal 100 determines whether an inquiry response message is received. When the inquiry response message is received, the first terminal 100 proceeds to step S1030. When the inquiry response message is not received, the first terminal 100 periodically and repeatedly performs step S1020.

In step S1030, the first terminal 100, which has received the inquiry response message from the second terminal 10, determines whether a recognition code is included in the inquiry response message. When the recognition code is not included in the inquiry response message, the first terminal 100 proceeds to step S1040. When the recognition code is included in the inquiry response message, the first terminal 100 performs step S1070.

In step S1040, the first terminal 100 enters a standby state. Accordingly, the first terminal 100 collects various pieces of information, such as an ADDR and the like, from other terminals around the first terminal 100, generates a list of neighboring terminals based on a result of the collection, and displays the generated list on the first display unit 160.

In step S1050, the first terminal 100 determines whether a user selects a particular terminal from among the neighboring terminals displayed in the list.

When the user selects a particular terminal, in step S1060, the first terminal 100 performs paging with respect to the particular terminal (in the present example, the second terminal 10) selected in step S1050, and the first terminal continues to step S1090. When the user does not select a particular terminal, the first terminal repeats the determination step of S1050.

In step S1070, the first terminal 100 acquires an ADDR included in the inquiry response message. In step S1080, the first terminal 100 immediately performs paging with respect to the second terminal 10 having the acquired ADDR, and the first terminal continues to step S1090. Specifically, the first terminal 100 immediately performs paging with respect to the second terminal 10 without a standby state of receiving an inquiry response from each of the other neighboring terminals. Before the first terminal 100 performs paging with respect to the second terminal 10, it may display a window for inputting a password, on the first display unit 160.

In step S1090, the first terminal 100 determines whether pairing between it and the second terminal 10 is completed. When pairing between the first terminal 100 and the second terminal 10 is completed, the first terminal 100 proceeds to step S1095, and performs communication, such as data exchange, with the second terminal 10. When pairing between the first terminal 100 and the second terminal 10 is not completed, the determination step S1090 is repeated.

In the method for performing wireless communication, according to an embodiment of the present invention, a case is described in which a recognition code is included in an inquiry response message. However, both the first terminal 100 and the second terminal 10 sense an overlap of them. Accordingly, regardless of whether the first terminal 100 receives a recognition code, just before or after the overlap is sensed, the first terminal 100 may perform automatic pairing between it and the second terminal 10, which transmits an inquiry response message, together with the second terminal 10.

Figure 11:
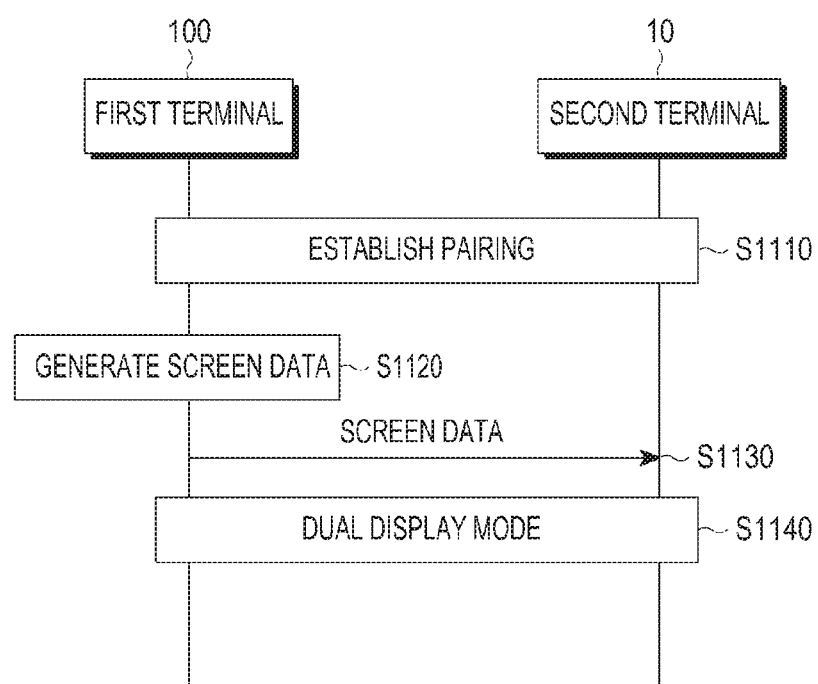
FIG. 11 is a signal flow diagram illustrating a dual display method, according to an embodiment of the present invention.

FIG. 11 is a signal flow diagram illustrating a dual display method, according to an embodiment of the present invention.

In step S1110, which is a wireless pairing step, wireless pairing between the first terminal 100 and the second terminal 10 is established. This wireless pairing may be established in the manner as described with reference to FIG. 8 or FIG. 9. Also, this wireless pairing may be established by using one of the wireless communication protocols, such as, for example, Wi-fi 802.11x, IrDA, Zigbee, NFC, RFID, and UWB.

In step S1120, which is a step of generating screen data, the first terminal 100 recognizes an overlap of it and the second terminal 10, and generates first screen data and second screen data. The first screen data and the second screen data may be generated based on an overlap position. The first terminal 100 may generate screen data in a dual display scheme, which has previously been set or is set by the user's selection. For example, in the case of a division display scheme, the first screen data and the second screen data may represent two images, into which an image such as an application window or a home screen is divided, respectively. For example, in the case of an independent display scheme, the first screen data may represent one application window, and the second screen data may represent information on an application that the second terminal 10 is to execute. In an example of the division display scheme, when a left or right part of the first terminal 100 overlaps the second terminal 10, the first screen data and the second screen data may represent two images, into which an image such as an application window or a home screen is horizontally divided, respectively. Also, when an upper or lower part of the first terminal 100 overlaps the second terminal 10, the first screen data and the second screen data may represent two images, into which an image such as an application window or a home screen is vertically divided, respectively.

In an example of the independent display scheme, when the left or right part of the first terminal 100 overlaps the second terminal 10, the first terminal 100 may display one application window, and the second terminal 10 may vertically display a text input interface. Also, when the upper or lower part of the first terminal 100 overlaps the second terminal 10, the first terminal 100 may display one application window, and the second terminal 10 may horizontally display a text input interface.

In step S1130, which is a step of transmitting screen data, the first terminal 100 transmits the second screen data to the second terminal 10. In the case of the division display scheme, the generation and transmission of second screen data may be periodically performed. In the case of the independent display scheme, the generation and transmission of second screen data may be aperiodically performed when an event such as user input occurs.

In step S1140, which is a step of performing a dual display mode, the first terminal 100 displays a first screen, which is based on the first screen data, and the second terminal 10 displays a second screen, which is based on the second screen data.

Figure 12:
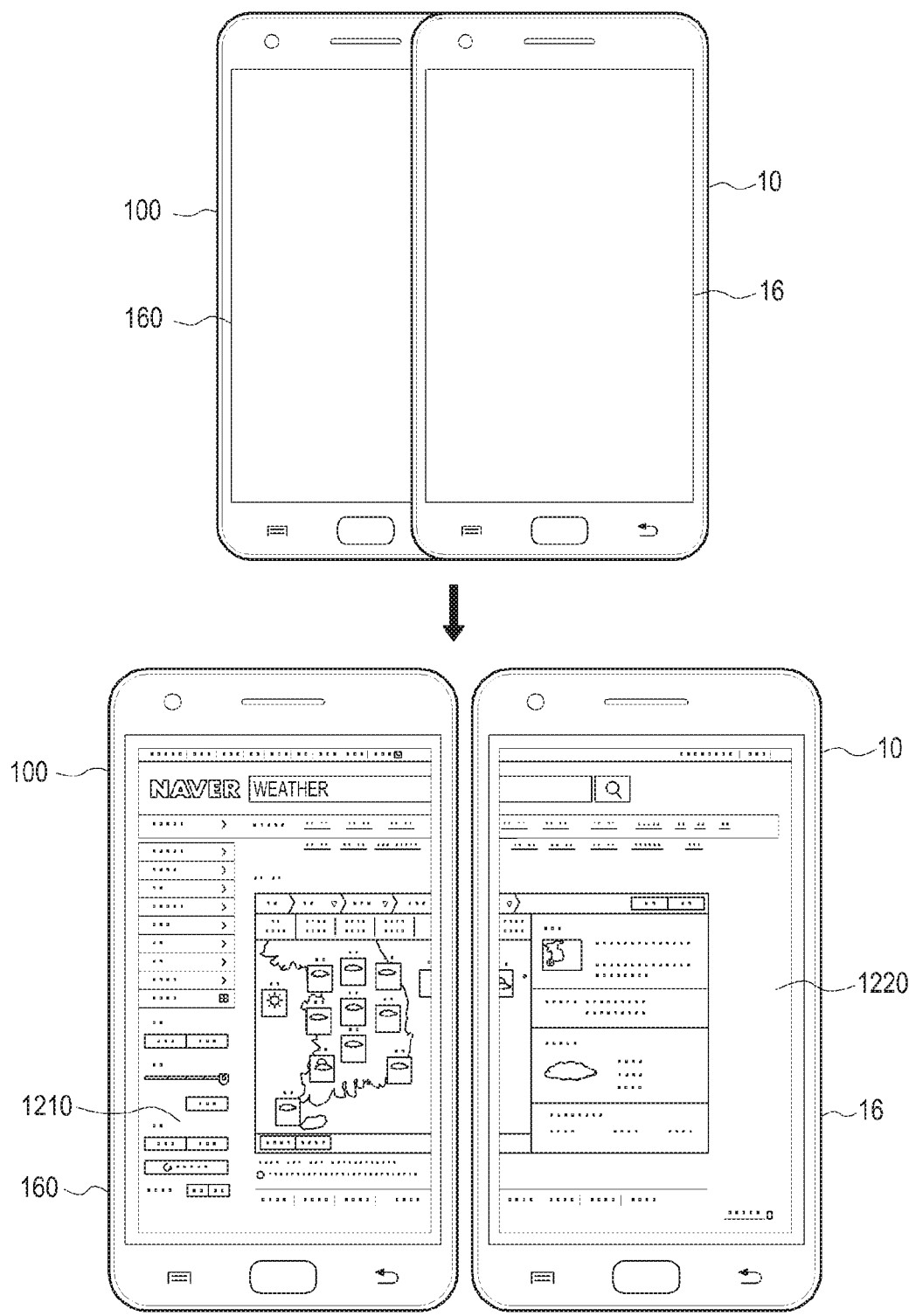
FIG. 12 is a diagram illustrating a dual display method, according to an embodiment of the present invention.

FIG. 12 is a diagram illustrating a dual display method, according to an embodiment of the present invention.

Referring to the upper portion of FIG. 12, the first terminal 100 recognizes an overlap of it and the second terminal 10, and generates first screen data and second screen data. The first terminal 100 recognizes that a left part thereof overlaps the second terminal 10, horizontally divides one Internet application window into a first screen and a second screen, and transmits second screen data representing the second screen to the second terminal 10.

Referring to the lower portion of FIG. 12, the first display unit 160 of the first terminal 100 displays a first screen 1210 (i.e., one half of the Internet application window), which is based on the first screen data. The second display unit 16 of the second terminal 10 displays a second screen 1220 (i.e., the remaining half of the Internet application window), which is based on the second screen data.

Figure 13:
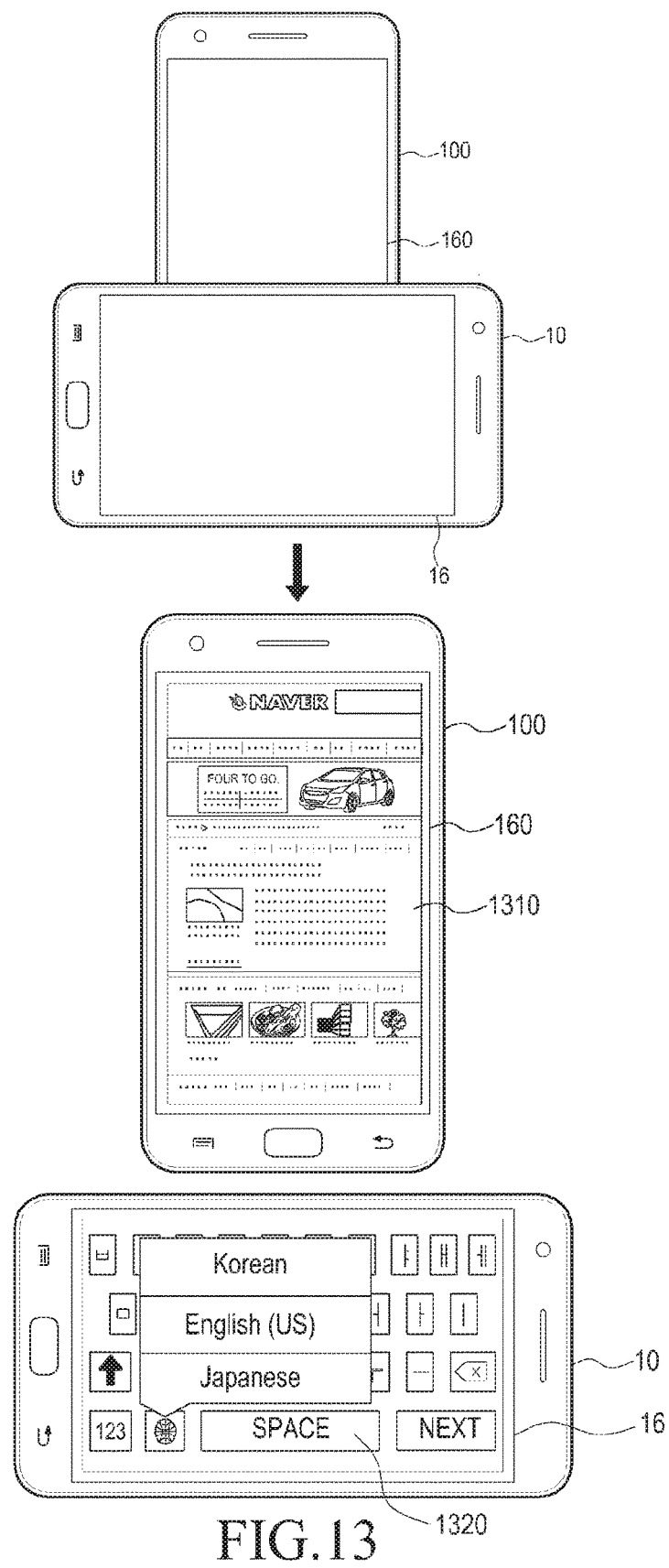
FIG. 13 is a diagram illustrating a dual display method, according to another embodiment of the present invention.

FIG. 13 is a diagram illustrating a dual display method, according to another embodiment of the present invention.

Referring to the upper portion of FIG. 13, the first terminal 100 recognizes an overlap of it and the second terminal 10, and generates first screen data and second screen data. The first terminal 100 recognizes that a lower part thereof overlaps the second terminal 10, and generates first screen data representing one Internet application window and second screen data representing a text input interface. The first terminal 100 transmits the second screen data to the second terminal 10.

Referring to the lower portion of FIG. 13, the first display unit 160 of the first terminal 100 displays a first screen 1310, which is based on the first screen data. The second display unit 16 of the second terminal 10 displays a second screen 1320, which is based on the second screen data. The first terminal 100 displays the first screen 1310 representing the one Internet application window, and the second terminal 10 displays the second screen 1320 representing the text input interface. The fact that the first screen 1310 represents the one Internet application window implies that the first screen 1310 displays the undivided Internet application window, and does not imply that the entire first screen 1310 includes only the Internet application window, or that the entire Internet application window is displayed on one screen. Specifically, the Internet application window may be displayed on a part of the first screen 1310, or a part of the Internet application window may be displayed.

The first terminal 100 and the second terminal 10, as described above, may be referred to as a "main terminal" and a "neighboring terminal," respectively, in order to distinguish between them.

Also, according to embodiments of the present invention, by using an EMR panel which is used as a touch sensing means in an existing terminal, pairing between terminals can be easily established without a complicated authentication procedure.

It will be appreciated that embodiments of the present invention may be implemented in the form of hardware, software, or a combination of hardware and software. Any such software may be stored in a volatile or non-volatile storage device such as a ROM, or in a memory such as a RAM, a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine (e.g., a computer), regardless of whether the software can be deleted or rewritten. It will be appreciated that the memory which may be included in the terminal is an example of a non-transient machine-readable storage medium suitable for storing a program or programs including instructions for implementing the embodiments of the present invention. Accordingly, embodiments of the present invention include a program including codes for implementing an apparatus or a method, and a non-transitory storage medium which stores this program and is readable by a machine.

Also, the terminal may receive and store the program from a device for providing a program, which is connected to the terminal by a wire or wirelessly. The device for providing a program may include: a memory for storing a program including instructions which cause the terminal to perform a previously-set wireless communication method and/or a previously-set dual display method, information required for the wireless communication method and/or the dual display method; a communication unit for performing wired or wireless communication with the terminal; and a controller for performing a control operation so as to transmit the relevant program to the terminal, at a request from the terminal or automatically.

While the invention has been shown and described with reference to certain embodiments thereof, it will be understood by those skilled in the art that various changes in form and detail may be made therein without departing from the spirit and scope of the invention as defined by the appended claims and equivalents thereof.

What is claimed is:

1. A method for performing wireless communication between terminals, by a main terminal, the method comprising the steps of:
    executing an application by the main terminal;
    presenting a screen for displaying the executed application on the main terminal;
    connecting to a neighboring terminal by a wireless communication;
    providing, to the neighboring terminal, a portion of the screen being displayed on the main terminal; and
    presenting another portion of the screen on the main terminal while the portion of the screen provided from the main terminal is presented on the neighboring terminal,
    wherein when the main terminal is overlapped by the neighboring terminal vertically, the screen is vertically divided into a first vertically divided portion and a second vertically divided portion,
    wherein the second vertically divided portion is more overlapped by the neighboring terminal than the first vertically divided portion, and
    wherein the first vertically divided portion is presented on the main terminal, and the second vertically divided portion is presented on the neighboring terminal.

2. The method as claimed in claim 1, further comprising:
    transmitting an inquiry message to the neighboring terminal;
    receiving an inquiry response message from the neighboring terminal; and
    determining whether the inquiry response message comprises a recognition code indicating that the main terminal is overlapped by the neighboring terminal,
    wherein the main terminal automatically performs connecting to the neighboring terminal when the inquiry response message includes the recognition code.

3. The method as claimed in claim 1, further comprising displaying, to a user, a list of terminals, which are capable of being connected to the main terminal and include the neighboring terminal, when the main terminal is not overlapped by the neighboring terminal.

4. The method as claimed in claim 1, further comprising:
    detecting a signal output from a touch sensor of the neighboring terminal; and
    determining whether the detected signal has a voltage value greater than or equal to a threshold,
    wherein it is determined that the main terminal is overlapped by the neighboring terminal, when the detected signal has the voltage value greater than or equal to the threshold.

5. The method as claimed in claim 1, wherein a touch sensor of the neighboring terminal operates in an Electromagnetic Resonance (EMR) scheme, and a signal output from the touch sensor corresponds to a signal in a form of an electromagnetic wave for detecting a position of a pen input.

6. The method as claimed in claim 1, further comprising:
    detecting a signal emitted from an external pen and a signal output from a touch sensor of the neighboring terminal; and
    distinguishing the signal emitted from the external pen and the signal output from the touch sensor of the neighboring terminal.

7. The method as claimed in claim 6, wherein distinguishing the signal emitted from the external pen and the signal output from the touch sensor of the neighboring terminal is performed by at least one filter.

8. The method as claimed in claim 1, further comprising:
determining an overlap direction of the main terminal and the neighboring terminal.

9. The method as claimed in claim 1, wherein when the main terminal is overlapped by the neighboring terminal horizontally, the screen is horizontally divided into a first horizontally divided portion and a second horizontally divided portion,
wherein the second horizontally divided portion is more overlapped by the neighboring terminal than the first horizontally divided portion, and
wherein the first horizontally divided portion is presented on the main terminal, and the second horizontally divided portion is presented on the neighboring terminal.

10. A non-transitory machine-readable storage medium storing a program, which when executed implements a method for performing wireless communication between terminals by a main terminal, the method comprising the steps of:
executing an application by the main terminal;
presenting a screen for displaying the executed application on the main terminal;
connecting to a neighboring terminal by a wireless communication;
providing, to the neighboring terminal, a portion of the screen being displayed on the main terminal; and
presenting another portion of the screen on the main terminal while the portion of the screen provided from the main terminal is presented on the neighboring terminal,
wherein when the main terminal is overlapped by the neighboring terminal vertically, the screen is vertically divided into a first vertically divided portion and a second vertically divided portion,
wherein the second vertically divided portion is more overlapped by the neighboring terminal than the first vertically divided portion, and
wherein the first vertically divided portion is presented on the main terminal, and the second vertically divided portion is presented on the neighboring terminal.

11. The non-transitory machine-readable storage medium as claimed in claim 10, wherein the method further comprises:
determining an overlap direction of the main terminal and the neighboring terminal.

12. The non-transitory machine-readable storage medium as claimed in claim 10, wherein when the main terminal is overlapped by the neighboring terminal horizontally, the screen is horizontally divided into a first horizontally divided portion and a second horizontally divided portion,
wherein the second horizontally divided portion is more overlapped by the neighboring terminal than the first horizontally divided portion, and
wherein the first horizontally divided portion is presented on the main terminal, and the second horizontally divided portion is presented on the neighboring terminal.

13. An apparatus for performing wireless communication between the apparatus and a neighboring terminal, the apparatus comprising:
a communication unit;
a touch screen for displaying images and sensing an input on the touch screen;
a controller for:
executing an application;
presenting a screen displaying an application window for the executed application on the touch screen;
connecting to the neighboring terminal by a wireless communication;
providing, to the neighboring terminal, a portion of the screen being displayed on the touch screen of the apparatus; and
presenting another portion of the screen on the touch screen of the apparatus while the portion of the screen provided from the apparatus is presented on the neighboring terminal,
wherein when the apparatus is overlapped by the neighboring terminal vertically, the screen is vertically divided into a first vertically divided portion and a second vertically divided portion,
wherein the second vertically divided portion is more overlapped by the neighboring terminal than the first vertically divided portion, and
wherein the first vertically divided portion is presented on the apparatus, and the second vertically divided portion is presented on the neighboring terminal.

14. The apparatus as claimed in claim 13, wherein the controller is configured to:
transmit an inquiry message to the neighboring terminal;
receive an inquiry response message from the neighboring terminal;
determine whether the inquiry response message comprises a recognition code indicating that the apparatus is overlapped by the neighboring terminal; and
automatically perform connecting to the neighboring terminal when the inquiry response message includes the recognition code.

15. The apparatus as claimed in claim 13, wherein the controller controls the touch screen to display, to a user, a list of terminals, which are capable of being connected to the apparatus and include the neighboring terminal, when the apparatus is not overlapped by the neighboring terminal.

16. The apparatus as claimed in claim 13, wherein the controller is configured to:
detect a signal output from a touch sensor of the neighboring terminal;
determine whether the detected signal has a voltage value greater than or equal to a threshold; and
determine that the apparatus is overlapped by the neighboring terminal, when the detected signal has the voltage value greater than or equal to the threshold.

17. The apparatus as claimed in claim 13, wherein a touch sensor of the neighboring terminal operates in an Electromagnetic Resonance (EMR) scheme, and the signal output from the second touch sensor corresponds to a signal in a form of an electromagnetic wave for detecting a position of a pen input.

18. The apparatus as claimed in claim 13, further comprising at least one filter for distinguishing a signal emitted from an external pen and a signal output from a touch sensor of the neighboring terminal.

19. The apparatus as claimed in claim 13, wherein the controller is configured to:
determine an overlap direction of the apparatus and the neighboring terminal.

20. The apparatus as claimed in claim 13, wherein when the apparatus overlaps the neighboring terminal horizontally, the screen is horizontally divided into a first horizontally divided portion and a second horizontally divided portion, wherein the second horizontally divided portion is more overlapped by the neighboring terminal than the first horizontally divided portion, and
wherein the first horizontally divided portion is presented on the apparatus, and the second horizontally divided portion is presented on the neighboring terminal.

* * * * *